(12) United States Patent
Jene et al.

(10) Patent No.: US 12,117,034 B2
(45) Date of Patent: Oct. 15, 2024

(54) APPARATUS FOR FASTENING A FUNCTIONAL ELEMENT TO A SECTION OF A WORKPIECE

(71) Applicant: PROFIL Verbindungstechnik GmbH & Co. KG, Friedrichsdorf (DE)

(72) Inventors: Tobias Jene, Friedrichsdorf (DE); Oliver Diehl, Usingen (DE); Christoph Becker, Grünberg (DE); André Mordelt, Frankfurt a. M. (DE); Maik Beutler, Pohl-Göns (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 88 days.

(21) Appl. No.: 17/961,624

(22) Filed: Oct. 7, 2022

(65) Prior Publication Data

US 2023/0110968 A1   Apr. 13, 2023

(30) Foreign Application Priority Data

Oct. 8, 2021   (DE) .......................... 102021126167.8

(51) Int. Cl.
*F16B 37/06*   (2006.01)
*B23P 19/06*   (2006.01)

(52) U.S. Cl.
CPC .......... *F16B 37/068* (2013.01); *B23P 19/064* (2013.01)

(58) Field of Classification Search
CPC ....... F16B 37/068; B23P 19/064; B23P 11/00; B23P 19/00
See application file for complete search history.

(56) References Cited

U.S. PATENT DOCUMENTS

| | | | | |
|---|---|---|---|---|
| 2,426,106 A | * | 8/1947 | Kinley | E21B 43/112 166/55.3 |
| 2,984,001 A | | 5/1961 | Lyon | |
| 3,851,373 A | * | 12/1974 | Shinjo | F16B 37/065 411/968 |

(Continued)

FOREIGN PATENT DOCUMENTS

| | | |
|---|---|---|
| DE | 743065 C | 12/1943 |
| GB | 318992 A | 8/1930 |
| JP | 2010046709 A | 3/2010 |

*Primary Examiner* — Nathaniel C Chukwurah
(74) *Attorney, Agent, or Firm* — Gregory J. Gore, Esq.

(57) ABSTRACT

The present invention relates to an apparatus for fastening a functional element to a section of a workpiece and/or for reshaping a section of the workpiece, comprising a support device for supporting the workpiece, wherein the workpiece section has a first surface facing the support device and a second surface facing away from the support device. The support device comprises a first support element having a first workpiece support surface that is associated with the first surface, and a second support element having a second workpiece support surface that faces away from the first workpiece support surface and that is associated with a supporting surface. The first and the second support element are movable relative to one another by a spreading device such that the first and the second workpiece support surface can be moved away from one another in an axial direction, in particular wherein the axial direction extends perpendicular to the first and/or second workpiece support surface.

26 Claims, 10 Drawing Sheets

(56) References Cited

U.S. PATENT DOCUMENTS 5,329,694 A * 7/1994 Sickels ................. B23P 19/062
                                                            29/243.518
7,559,136 B2 * 7/2009 Shinjo ................... B23P 19/062
                                                            29/243.518

\* cited by examiner

APPARATUS FOR FASTENING A FUNCTIONAL ELEMENT TO A SECTION OF A WORKPIECE

FIELD OF THE INVENTION

The present invention relates to an apparatus for fastening a functional element to a section of a workpiece and/or for reshaping a section of the workpiece.

BACKGROUND OF THE INVENTION

It is often necessary to fasten further components to a workpiece. A direct fastening of the components is not possible in some cases, or only with a comparatively great effort. In such cases, functional elements are first fixed to the workpiece and then serve as fastening points for the components. For example, in automotive engineering it is often necessary to fasten a nut element to a sheet metal part, said nut element, together with a suitable screw, making it possible to establish a screw connection. In some cases, it is also desired to provide the workpiece with a bolt element that in turn serves as an anchorage point.

In general, a number of methods are known with which such functional elements can be fastened to planar components or workpieces. In this respect, the component or workpiece is usually placed on a flat die or support surface and the fastening element is guided to and connected to the workpiece. There are, for example, force fitting elements that are characterized in that they are at least not intentionally deformed on an attachment to the workpiece, but that the workpiece is deformed and brought into engagement with shape features of the force fitting element, wherein the force fitting element is fastened to the workpiece, for example to a sheet metal part, in a manner secure against being pressed out. However, rivet elements are also known in which the element is intentionally deformed on the attachment to the sheet metal part, usually to form a rivet bead, whereby the sheet metal part is fixed between the rivet bead and a flange part in order also to achieve a connection secure against being pressed out in this instance.

Both force fitting elements and rivet elements are furthermore known as self-punching elements. The designation self-punching is to be understood such that the corresponding element punches its own hole in the workpiece in the course of the fastening process. The force required for this purpose is produced by a press, for example. In this respect, the self-punching element is pressed against the workpiece while the latter is supported on a corresponding die or surface at the side facing away from the element.

Self-punching elements are indeed frequently associated with cost advantages since the workpiece does not have to be pre-punched. However, there are indeed also applications in which a pre-punching of the workpiece and an introduction of a section of the functional element into the prepared hole are unproblematic or even advantageous, for example, since fewer stresses then occur during the subsequent fastening process.

In all the known methods, a reliable support of the workpiece is of elementary importance since considerable forces occur during the fastening process. This is not a problem with planar workpieces since they can be simply placed on a flat die. However, if the functional element is to be fastened to a workpiece having a complex geometry, known approaches very quickly reach their limits. It is then often no longer possible for them to provide sufficiently good support for the section of the workpiece to which the functional element is to be fastened.

The fitting of hollow sections with functional elements is particularly problematic, in particular if the former consist of a comparatively soft material. There is then a particularly high risk that the forces required for fastening the functional elements will deform the workpiece, which is of course unacceptable.

However, the problems explained above occur not only in connection with the fastening of a functional element, but also during certain machining processes of the workpiece itself that are associated with considerable forces. This includes, for example, a reshaping of a section of the workpiece, in particular by a cold forming process. A reshaping is also to be understood as a punching process by which an opening is produced in the workpiece section.

SUMMARY OF THE INVENTION

The present invention sets the object of remedying this situation and providing an apparatus by which functional elements can be fastened to a section of a workpiece having a complex geometry. The apparatus should also make it possible to reshape sections of such workpieces.

In accordance with the invention, the apparatus comprises a support device for supporting the workpiece, wherein the workpiece section has a first surface facing the support device and a second surface facing away from the support device. The support device comprises a first support element having a first workpiece support surface that is associated with the first surface, and a second support element having a second workpiece support surface that faces away from the first workpiece support surface and that is associated with a supporting surface. The first and the second workpiece support surface are in particular arranged in parallel with one another.

In accordance with the invention, the support device comprises a spreading device by means of which the first and the second support element are movable relative to one another such that the first and the second workpiece support surface can be moved away from one another in an axial direction. The axial direction in particular extends perpendicular to the first and/or second workpiece support surface.

Thus, the apparatus in accordance with the invention is not a substantially "rigid" die of conventional design. Due to support elements that can be moved away from one another and due to a suitable spreading device that can produce a corresponding movement, the apparatus enables a dynamic adaptation of the support device to the respective present situation. The support device can, for example, be brought into a compact base position so that it can be introduced into complex workpieces and placed in working positions that are difficult to access. In the intended working position in the region of the workpiece section that is to be provided with the functional element and/or that is to be reshaped, the support elements are then moved away from one another by the spreading device and are brought into a working position. In this working position, the first workpiece support surface is—directly or indirectly—in contact with the first surface of the workpiece, while the second workpiece support surface is—directly or indirectly—supported at a supporting surface that is, for example, arranged at another section of the workpiece or at a stationary support or surface. In this state, the section of the workpiece to be machined is thus reliably supported at a suitable supporting surface via the adaptable support device so that the fastening and/or reshaping process can be performed without damaging the workpiece.

Further embodiments of the invention are set forth in the description, in the drawings, and in the claims.

In accordance with an embodiment, the apparatus comprises a punch movable along an axial direction for reshaping a section of the functional element and/or the workpiece section. The punch is in particular movable in the axial direction toward the second surface of the workpiece section. A setting device can also be provided that is movable in the axial direction to guide the functional element to the second surface and to perform the fastening process. In the two embodiments described above, provision is therefore made to guide a machining unit of any design to the section of the workpiece to be machined while said section is—directly or indirectly—supported at the first workpiece support surface and thus ultimately at the supporting surface.

In many cases, it can be advantageous if the first surface is directly supported at the first workpiece support surface and/or the second workpiece support surface is directly supported at the supporting surface. However, it is also conceivable that the support device comprises a first intermediate element that is arranged between the first workpiece support surface and the first surface. Alternatively or additionally, the support device can comprise a second intermediate element that is arranged between the second workpiece support surface and the supporting surface. The intermediate elements can be releasably fastened to the workpiece support surface associated with each of them. The support device can thereby, for example, be adapted as required to the respective present geometric conditions without the support device having to be changed. Furthermore, such intermediate elements are easily replaceable, in particular after advancing wear.

The first workpiece support surface and/or the first intermediate element can have at least one recess for at least partly receiving the functional element during the fastening process. For example, the element is placed into this recess before the support device is brought into the suitable position in the region of the section of the workpiece to be machined.

The punch and/or the setting device can comprise a first reshaping section for reshaping a fastening section of the functional element and/or the workpiece section. In this embodiment, a reshaping of the fastening section and/or the workpiece section is therefore provided from the second surface facing away from the support device.

Additionally or alternatively, provision can, however, also be made that the first support element comprises a second reshaping section for reshaping a section of the functional element and/or the workpiece section. Here, a reshaping of said components thus takes place from the direction of the first surface.

The second reshaping section can be formed at a reshaping element that is releasably fastened to the first support element. This measure makes it possible to be able to replace the reshaping element with only a small effort, for example, if the apparatus is to be adapted to new requirements and/or the reshaping element is worn. The reshaping element can be at least sectionally arranged in a receiving recess of the first support element. The receiving recess is preferably arranged in the first workpiece surface. In general, however, the receiving recess can also be provided in the first intermediate element—if present.

The first and/or the second reshaping section can have a punching edge to enable a punching of the workpiece section.

The spreading of the support device can be effected by various mechanisms. In accordance with a first embodiment, the spreading device has at least a first and a second wedge section that cooperate with one another such that a translatory movement of the wedge sections can be converted into the movement of the support elements in the axial direction. The first wedge section is in particular associated with the first support element and the second wedge section is in particular associated with the second support element.

In accordance with a second embodiment of the spreading device, it comprises an eccentric device having at least one eccentric element by whose rotation the movement of the support elements in the axial direction can be produced. For example, the eccentric device is arranged between the first support element and the second support element.

The above-described mechanical mechanisms of the spreading device, which is provided for producing the movement of the support elements in the axial direction, can be actuated by hydraulic actuators and/or pneumatic actuators and/or electromechanical actuators. However, it is also possible for said actuators to also act directly between the support elements. The wedge sections or the eccentric device could then also be omitted.

The support device is preferably designed such that it can be introduced into a hollow space of a workpiece that is configured as a hollow section and that comprises the workpiece section provided for fastening the functional element and/or the workpiece section provided for reshaping and a supporting section which is disposed opposite said workpiece section and at which the supporting surface is formed. The term "hollow section" is to be broadly understood in this context. It can, for example, also be understood as workpieces having a cross-section that is not closed in the peripheral direction, for instance, workpieces that have the shape of a C in a cross-section or other complex geometric cross-sectional shapes. In the above-described embodiment of the support device, it is—directly or indirectly—in contact with surfaces arranged at the inner side of the workpiece. For example, the first surface and the supporting surface provided at the supporting section are arranged in parallel with one another. The support device thus "bridges" a hollow space of the hollow section so that said hollow section is not reshaped in an unwanted manner by the fastening and/or reshaping process.

The workpiece can, for example, be an extruded section that is in particular composed of aluminum or steel. The functional element is preferably likewise produced from metal, in particular from steel.

The present invention further relates to a method of fastening a functional element to a section of a workpiece and/or of reshaping a section of the workpiece, in particular wherein the workpiece is a hollow section.

In this respect, an apparatus is used that comprises a support device for supporting the workpiece, wherein the workpiece section has a first surface facing the support device and a second surface facing away from the support device. The support device comprises a first support element having a first workpiece support surface that is associated with the first surface, and a second support element having a second workpiece support surface that faces away from the first workpiece support surface and that is associated with a supporting surface. The first and the second support element are movable relative to one another by means of a spreading device such that the first and the second workpiece support surface are moved away from one another in an axial direction. The axial direction can extend perpendicular to the first and/or second workpiece support surface. An apparatus in accordance with one of the embodiments described above is preferably used in the method.

The method comprises at least the steps:
positioning the workpiece and/or the support device such that the workpiece section is arranged adjacent to the first workpiece support surface of the first support element;
actuating the spreading device until the first workpiece support surface is—directly or indirectly—in contact with the first surface and the second workpiece support surface is—directly or indirectly—in contact with the supporting surface; and
moving a punch in the axial direction toward the second surface to fasten the functional element to the workpiece section and/or to reshape the workpiece section.

Alternatively, the last method step can also comprise moving the functional element by means of a setting device in the axial direction toward the second surface to fasten the functional element to the workpiece section.

In accordance with an embodiment, the workpiece is a hollow section having a hollow space that is sectionally bounded by the first surface and a third surface that is disposed opposite the first surface and that comprises the supporting surface. The hollow section is preferably formed in one piece.

Provision can be made that an opening is produced in the workpiece section prior to the step of positioning the workpiece and/or the support device, said opening being provided for receiving a section of the functional element. In other words, the workpiece is pre-punched.

The support device can be fitted with at least one functional element prior to the step of positioning the workpiece and/or the support device. This means, for example, that the support device provided with one or more functional elements is introduced into the workpiece having a complex geometry. Advantageously, the elements are in this respect arranged at a side of the support device facing the first surface of the workpiece section, i.e. in the region of the first support element and/or of the first intermediate element. With the actuation of the spreading device, the functional elements are then pressed against the first surface so that the fastening process can be performed.

In the case of a pre-punched workpiece section, the workpiece and the support device are positioned such that a section of the functional element is aligned with the opening provided for it. This section of the functional element is introduced into the opening by the actuation of the spreading device.

A reshaping of the section of the functional element can be brought about by the movement of the punch. An undercut is preferably produced in this respect that stands in the way of a pressing out of the functional element in the axial direction. For example, a fastening section of the functional element introduced into a prefabricated opening is reshaped by the effect of the punch. The creation of an undercut is not absolutely necessary. It is also conceivable that the section of the functional element is pressed against a wall of the opening to produce a force fit between the element and the workpiece section.

In this connection, it is pointed out that, if necessary, a reshaping of the workpiece section can also be provided by the movement of the punch if this is advantageous in the respective application.

The step of reshaping the workpiece section can comprise a punching by which an opening is produced in the workpiece section. In accordance with the invention, it is therefore possible not only to fasten functional elements to a workpiece section, but—alternatively or additionally—to machine the workpiece section, in particular to punch one or more openings in the workpiece section.

For this purpose, the support device can have punching edges that cooperate with punching edges at the punch to cut a slug out of the workpiece section. The slug can be captured in a receiver of the support device. The slug is, for example, removed from said receiver after the support device has been removed from the workpiece again. However, it is also conceivable to provide removal passages in the support device through which punched-out slugs are led off.

It is also possible for the functional element to be self-punching. It thus itself punches the opening that receives it, wherein a punching edge provided at the functional element cooperates with a corresponding punching edge at the support device.

The present invention further relates to a component assembly that is manufactured in accordance with a method in accordance with any of the embodiments described above. The workpiece comprises a hollow section, preferably composed of aluminum or steel, and at least one functional element, preferably composed of steel, that is fastened to a section of the hollow section by means of a clinching process, a riveting process, a pressing-in process, or a welding process.

The fastening element can be a nut element or a bolt element. The two terms mentioned above are to be interpreted broadly. It is preferred, but not absolutely necessary for the nut element to be provided with an internal thread and the bolt element to be provided with an external thread. Instead of the threads, smooth surfaces can also be provided. It is also conceivable that the functional element is a component of a clamping connection or a clip connection.

BRIEF DESCRIPTION OF THE DRAWINGS

The present invention will be described in the following by way of example with reference to advantageous embodiments. There are shown.

DETAILED DESCRIPTION OF THE INVENTION

Figure 1A:
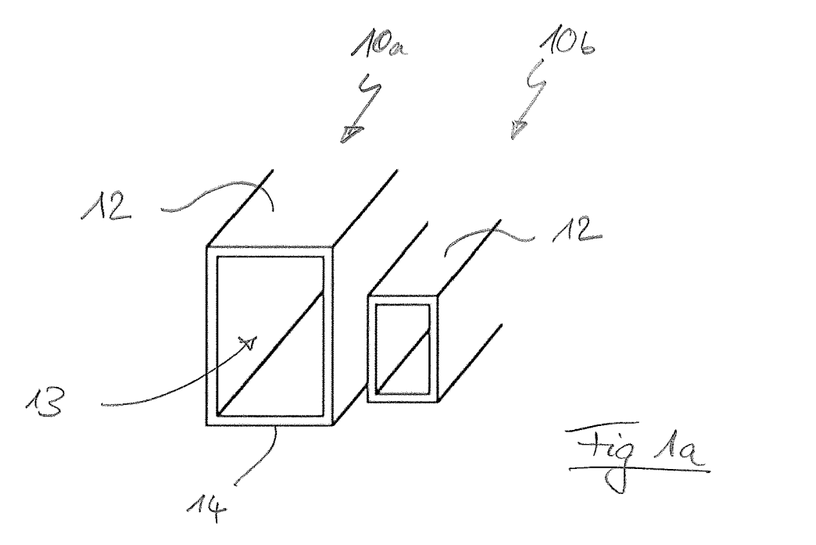
FIGS. 1a to 1c examples of workpieces that are configured as hollow sections.

FIG. 1a shows by way of example two hollow sections 10a and 10b that can be extruded sections, for example. For many applications in automotive engineering, such hollow sections are, for example, produced from aluminum or steel.

The hollow sections 10a, 10b can be dimensioned in any desired manner. Two examples of hollow sections 10a, 10b having differently dimensioned sides are shown. It is also by all means conceivable that the cross-section is substantially square and/or the edges are rounded. A hollow section in the sense of the present invention can, for example, also be understood as sections that are polygonal in cross-section.

The hollow sections 10a, 10b are closed in the peripheral direction. However, they can also have recesses or, as shown by means of FIGS. 1b and 1c, be sectionally open. The hollow section 10c of FIG. 1b has a substantially C-shaped cross-section, for example. The hollow section 10d of FIG. 1c has an even more complex shape.

Figure 1B:
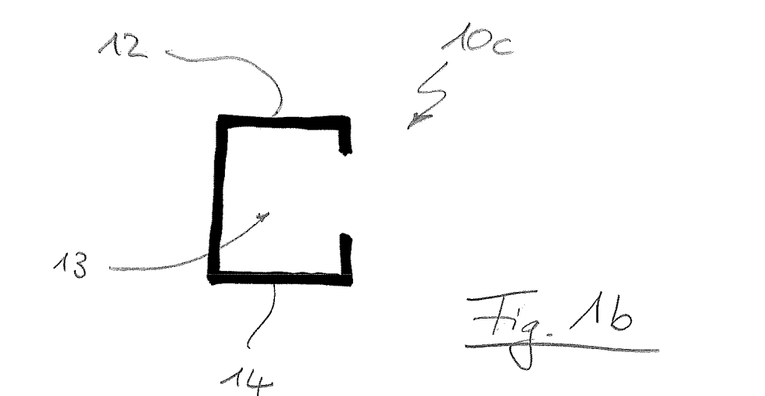
Figure 1C:
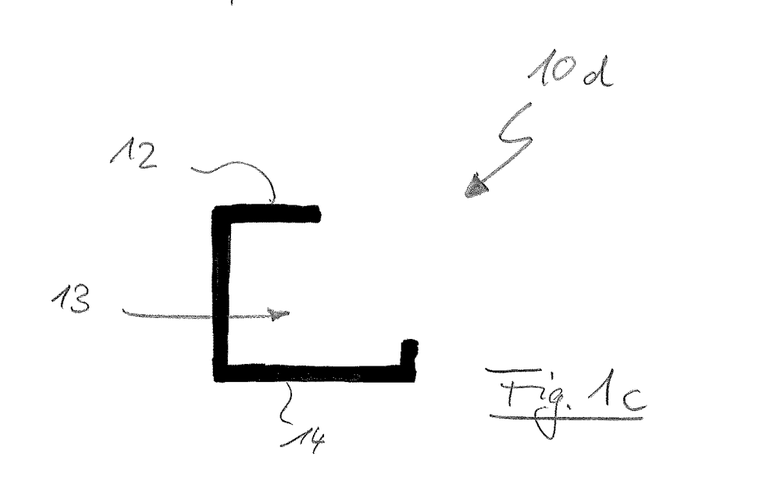

It is a common feature of all the hollow sections 10a to 10d shown by way of example that the fastening of a functional element to one of the side surfaces of the sections 10a to 10d, for example to a side surface 12, is not easily possible or is very complex using conventional methods. In contrast to planar workpieces, the hollow sections 10a, 10b, 10c, 10d (hereinafter referred to simply as hollow sections 10) cannot simply be placed on a die. The introduction of an element into the side surface 12 without its support would result in a huge deformation of the hollow section 10, which is not acceptable.

In accordance with the invention, it is therefore proposed to provide a support device having a variable geometry that acts as a die and that can be introduced into a hollow space 13 of the hollow section 10. In the examples shown below, the support device provides a support between the side surface 12 and a side surface 14 of the hollow section disposed opposite thereto.

Figure 2A:
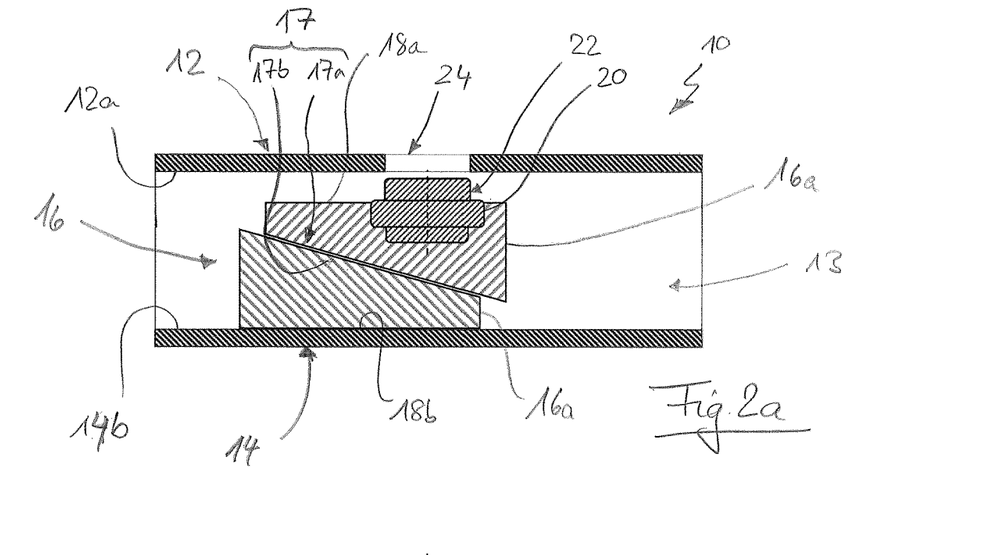
FIGS. 2a to 2c a first embodiment of the apparatus in accordance with the invention in different states.
Figure 2B:
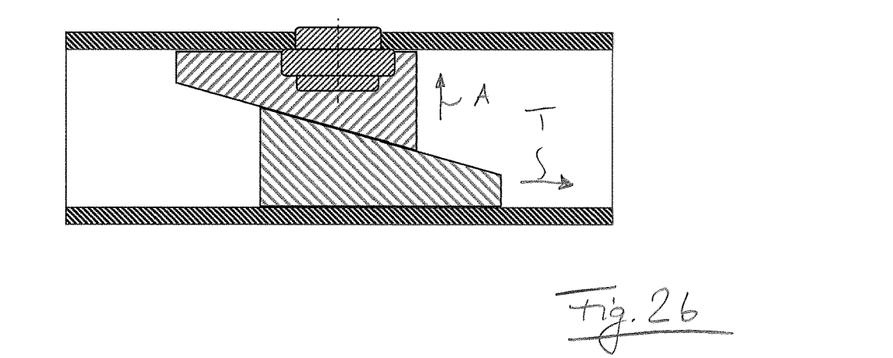
Figure 2C:
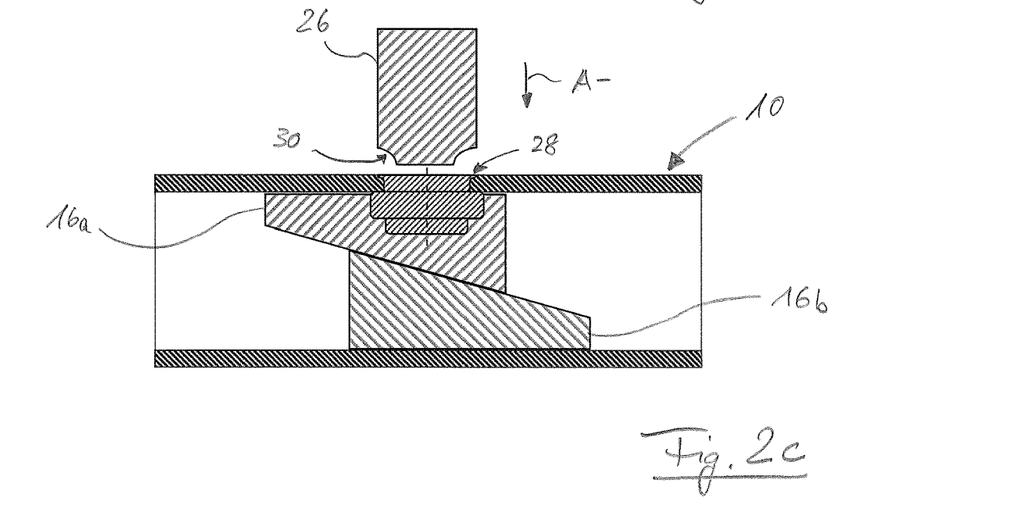

FIGS. 2a to 2c show a first embodiment of the support device that is marked by the reference numeral 16. The support device 16 comprises a first support element 16a and a second support element 16b that are wedge-shaped. They cooperate via slanted surfaces or wedge sections 17a, 17b.

The support elements 16a, 16b each have a support surface 18a and 18b respectively that are arranged at mutually oppositely disposed surfaces 12a, 14b of the side sections 12 and 14 respectively.

A base state of the support device 16 is shown in FIG. 2a. The support device 16 is fitted with a fastening element 20 that is configured as a nut element in the present embodiment. The fastening element 20 has a rivet section 22 that is provided for fastening the element 20 to the hollow section 10. The hollow section 10 has a prefabricated hole 24 for receiving the rivet section 22.

In the base position, the support device 16 is laterally introduced into a hollow space 13 of the hollow section 10 until the rivet section 22 is aligned with the hole 24. The support elements 16a, 16b are subsequently moved relative to one another to insert the rivet section 22 into the hole 24. In the present example, the support element 16a is not moved relative to the hollow section for this purpose in order not to cancel the correct orientation of the rivet section 22 relative to the hole 24. I.e. only the support element 16a is moved to the right (translatory movement T). Due to the wedge-shaped design of the support elements 16a, 16b, the former is moved upwardly in an axial direction A until the support surface 18a reliably contacts the surface 12a. This means that, on the one hand, a reliable support of the side section 12 at the support device 16, and thus also the side section 14, is provided. The side section 14 is in turn disposed on a stable support surface, not shown. On the other hand, the movement in axial direction A is limited so that the side section 12 is not bulged outwardly. The support device 16 is now in a working position.

The wedge sections 17a, 17b thus act as a spreading device 17 by whose actuation a spreading of the support device 16 in the hollow section 10 is brought about as required.

As soon as the fastening section 22 is correctly positioned and a reliable support of the side section 12 is established, the rivet section 22 is reshaped by a punch 26 moved against the axial direction A (direction of movement A−) so that a reshaped or beaded-over section 28 of the rivet section 22 engages behind the margin of the hole 24. The punch 26 has a correspondingly shaped reshaping section 30 for this purpose. Said reshaping section 30 engages into the rivet section 22 on a movement of the punch 26 in the direction of movement A−. Due to the divergent shaping of the reshaping section 30, the rivet section 22 is reshaped outwardly on a continued movement of the punch 26.

After the completion of the fastening process, the support device 16 can be moved from the working position shown in FIGS. 2b and 2c into the base position such as is shown in FIG. 2a. The element 20 remains at the hollow section 10 in this respect. For example, the support element 16b can first be completely removed so that the support element 16a can be lowered and can then likewise be removed.

Figure 3A:
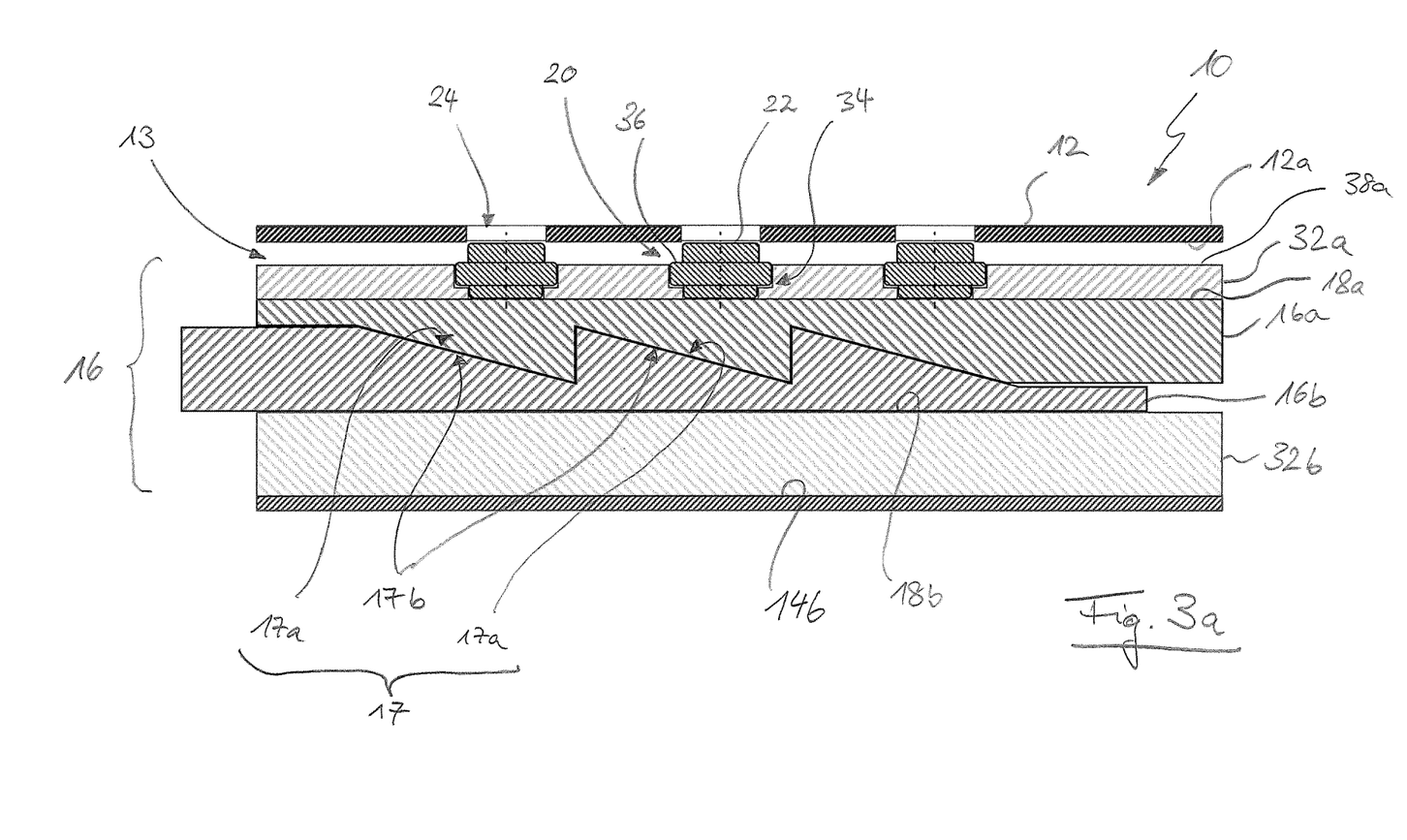
FIGS. 3a to 3c a second embodiment of the apparatus in accordance with the invention in different states.
Figure 3B:
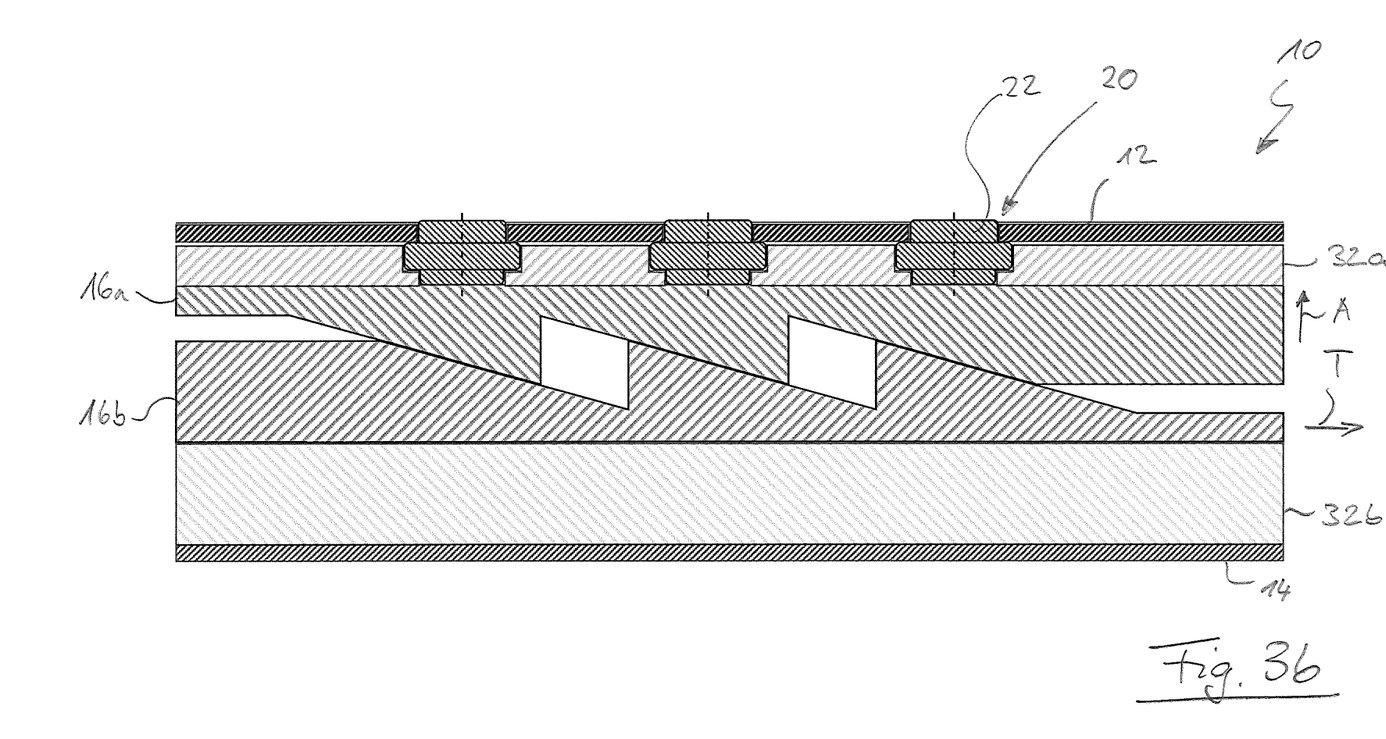
Figure 3C:
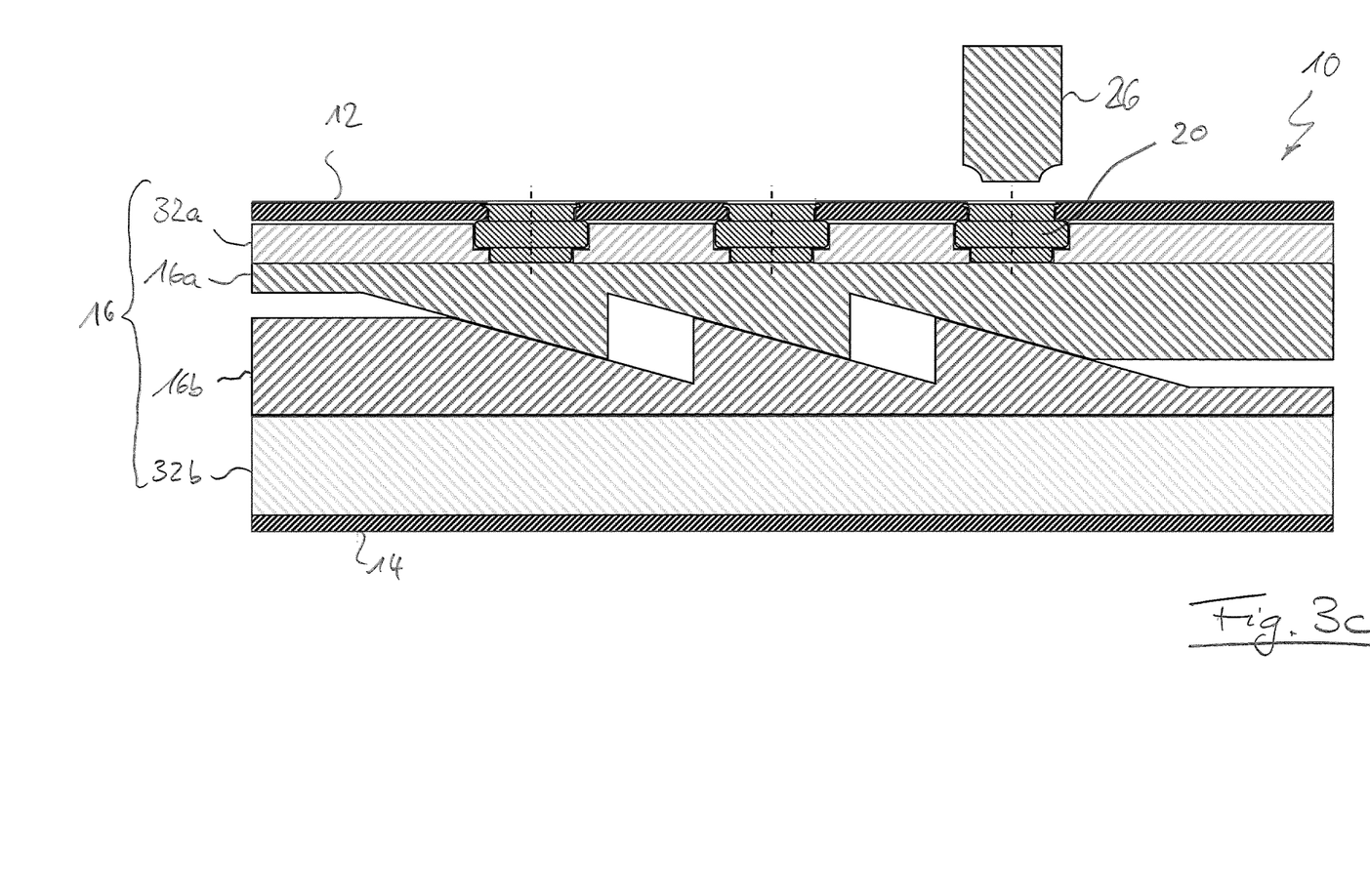

FIGS. 3a to 3c show a further embodiment of the support device 16. Said support device 16 makes it possible to simultaneously fasten a plurality of fastening elements 20 to holes 24 of the hollow section 10. In addition to the support elements 16a, 16b, which have a plurality of wedge sections 17a, 17b arranged behind one another, the support device 16 comprises intermediate elements 32a, 32b. The intermediate element 32a is arranged between the support surface 18a and the surface 12a of the side section 12. It has stepped recesses 34 for receiving a section of the fastening elements 20. It is thereby possible to arrange a flange 36 of the elements 20 substantially or almost flush with a surface 38a of the intermediate element 32a facing the surface 12a.

The intermediate element 32b is arranged between the support surface 18b and the surface 14b.

Due to the intermediate elements 32a, 32b, it is possible to use the support elements 16a, 16b with hollow sections 10 having different spacings of the side sections 12, 14. In the case of a greater spacing of said sections 12, 14, thicker intermediate elements 32a and/or 32b are simply used. Furthermore, the support device 16 can be very easily adapted to other geometries of the elements 20. For this purpose, only the intermediate element 32a, for example, has to be replaced that is provided with correspondingly changed recesses 34. A changed positioning of the holes 24 can also be easily taken into account by using a correspondingly adapted intermediate element 32a.

In FIG. 3a, the base position of the support device 16 is shown in the manner in which said support device 16 is inserted into the hollow space 13 of the hollow section. The support device 16 is in the working position in FIG. 3b. The support element 16a was moved upwardly in the axial direction A by a translatory movement T of the support element 16b to the right, whereby the rivet sections 22 of the fastening elements 20 are positioned in the holes 24.

Subsequently, the rivet sections 22 are simultaneously or successively reshaped by one or more punches 26, whereby the elements 20 are securely fixed to the hollow section (FIG. 3c).

After the completion of the fastening process, the support element 16b can be moved to the left again, whereby the support element 16a and the intermediate element 32a are lowered again. The support device 16 can now be removed from the hollow space 13.

Figure 4A:
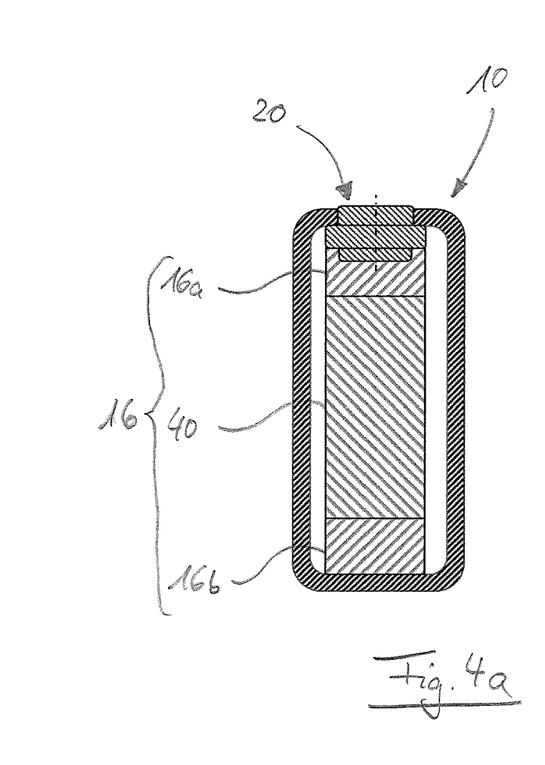
FIGS. 4a and 4b a third embodiment of the apparatus in accordance with the invention.
Figure 4B:
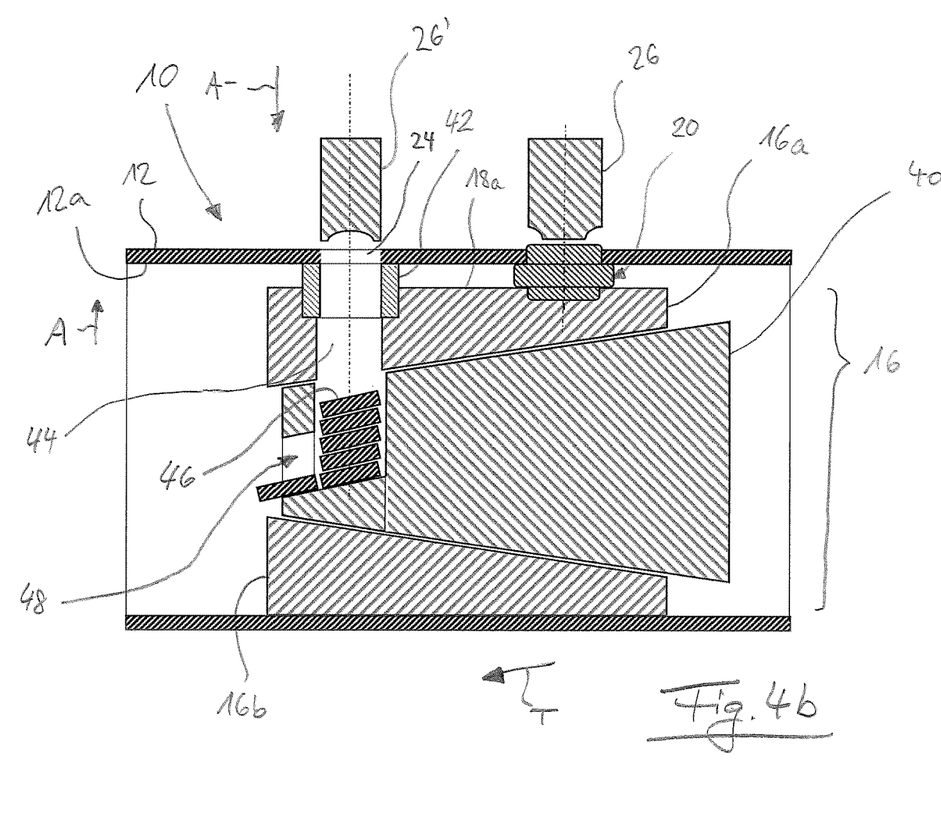

A further embodiment of the support device 16 is shown in FIGS. 4a and 4b. It comprises a central wedge element 40 that is arranged between two wedge-shaped support elements 16a, 16b. Due to a translatory movement T to the left, the slopes of said wedge element 40 run up against corresponding slopes of the support elements 16a, 16b, whereby the support element 16a is ultimately moved upwardly in the axial direction A. Due to the dual "wedge effect" of the spreading device formed by the slopes of the components, a greater axial movement A can be produced with an unchanged inclination of the wedge surfaces.

FIG. 4b further shows that, in addition to a fastening of an element 20 to the hollow section 10, a punching of an opening 20 into the side section 12 can also be implemented by means of the support device 16. For this purpose, the support element 16a is provided with a die element 42 that is inserted into an end section of a removal passage 44.

As soon as the support device 16 is in the working position, a slug 46 is punched out of the side section 12 in cooperation with the die element 42 by a movement of a punch 26' in a direction A– opposite the axial direction A. Said slug 46 falls down through the hollow die element 42 and the removal passage 44. In a suitable position of the wedge element 40, the removal passage 44 is in connection with a further passage 48 in the wedge element 40 through which the punched-out slugs 46 can then be further led off.

In FIG. 4b, the surfaces 18a, 12a are not in direct contact. This spacing could generally be overcome by an intermediate element 32a such as was, for example, shown by means of FIGS. 3a to 3c. In general, it is, however, also possible to omit said spacing if this is permitted by the forces and material properties occurring in the respective application.

FIG. 4a shows a cross-section through the hollow section 10 and the support device 16.

Figure 5A:
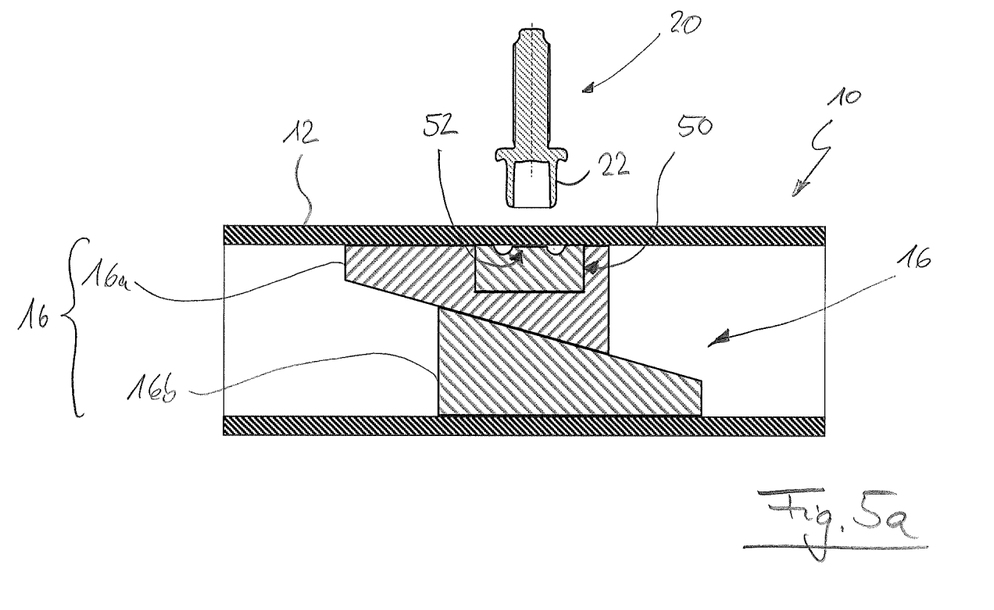
FIGS. 5a and 5b a fourth embodiment of the apparatus in accordance with the invention in different states.
Figure 5B:
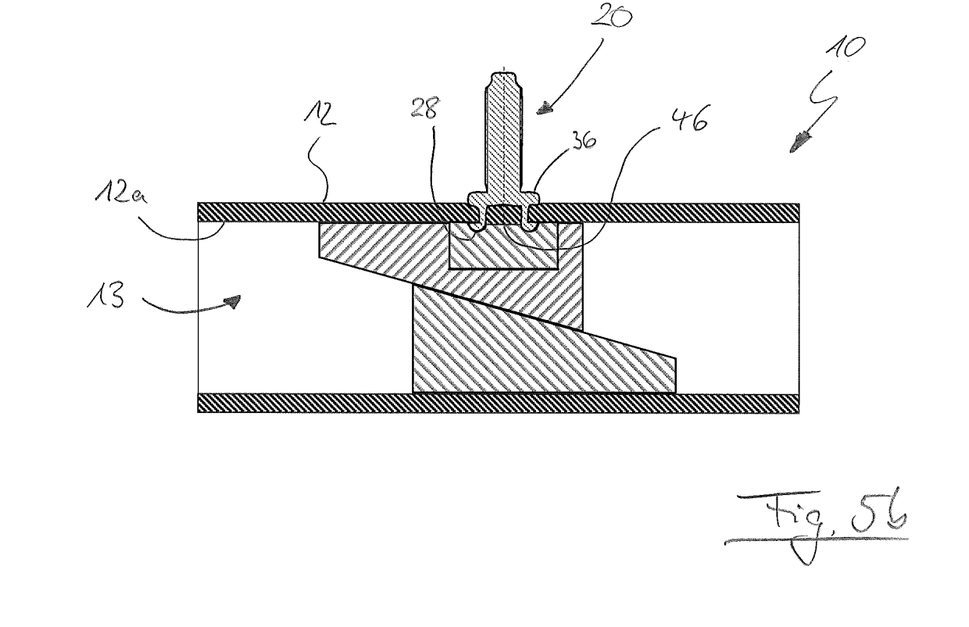

In FIGS. 5a and 5b, the use of an embodiment of the support device 16 together with a self-punching fastening element 20, here configured as a bolt element, is shown. The support device 16 is similar in large parts to those of FIGS. 2a to 2c. A reshaping element 50 is, however, arranged in the support element 16a. Said reshaping element 50 is arranged in a corresponding recess of the support element 16a and can be replaced in a simple manner if, for example, another element 20 is to be fastened to the section 10 or if the reshaping element 50 is worn and has to be replaced.

In FIG. 5a, the support device 16 is already in the working position. The fastening element 20 is then pressed fixedly against the side section 12 of the hollow section 10. The rivet section 22 of the element 20 has a punching edge that cooperates with a corresponding punching edge at a reshaping section 52 of the reshaping element 50. In this respect, a slug 46 is punched out that remains in the rivet section 22 after a removal of the support device 16, for example, since it is captured by clamping forces there. However, it can also be removed without problem through the hollow space 13 after the completion of the fastening process if it is not held by the rivet section 22.

In another respect, the reshaping section 52 is not only provided with a punching edge, but also has a curved reshaping section by which the rivet section 22 is sectionally bent over outwardly after the punching out of the slug and thus engages behind the surface 12a of the section 12. This means that the margin of the hole punched out by the element 20 is clamped by the flange 36 and the reshaped section 28 of the rivet section 22 so that the fastening element 20 is securely held at the hollow section 10.

Figure 6A:
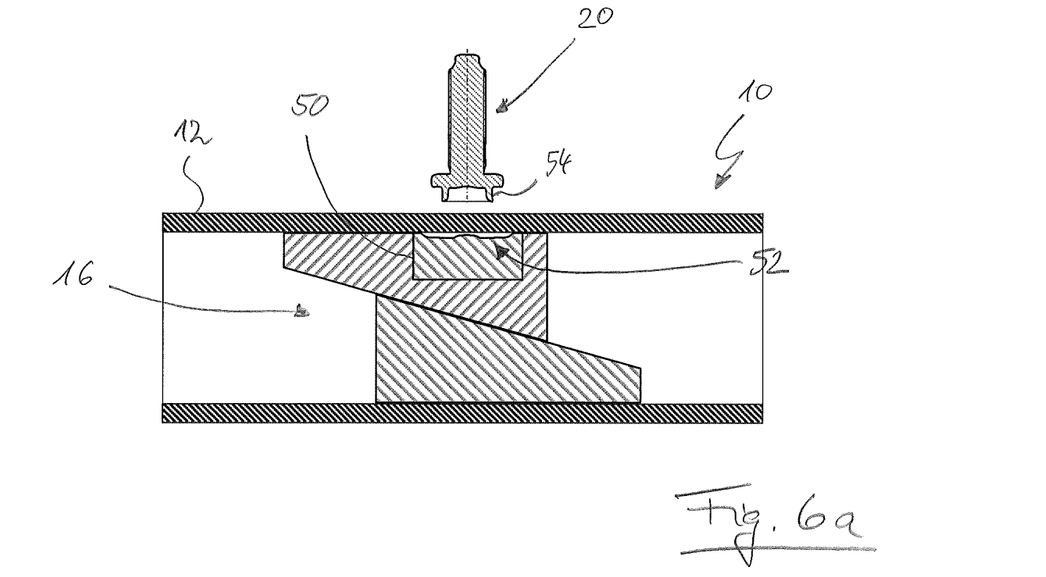
FIGS. 6a and 6b a fifth embodiment of the apparatus in accordance with the invention in different states.
Figure 6B:
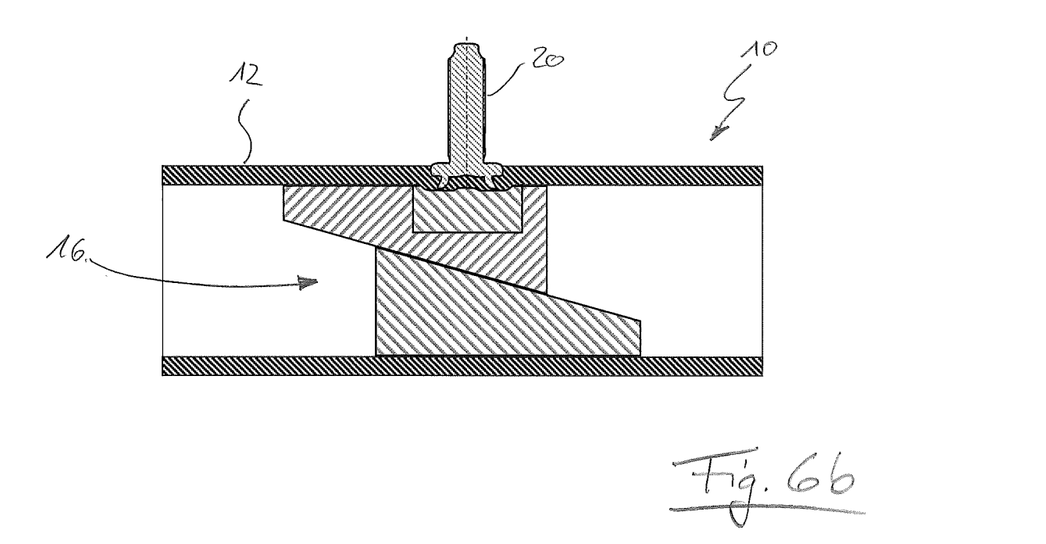

FIGS. 6a and 6b show the support device 16 of FIGS. 5a and 5b, wherein the reshaping element 52 has been replaced by another reshaping element comprising a reshaping section 52 having a different geometry. The element 20 to be fastened to the hollow section 10 has a fastening section 54 that, during the fastening process, does not penetrate the side section 12, but is widened by the geometry of the reshaping section 52 so that a pulling out of the bolt element 20 from the side section 12 is reliably prevented. Ultimately, there is a form fit here between the reshaped fastening section 54 and the interior of the section 12.

Figure 7A:
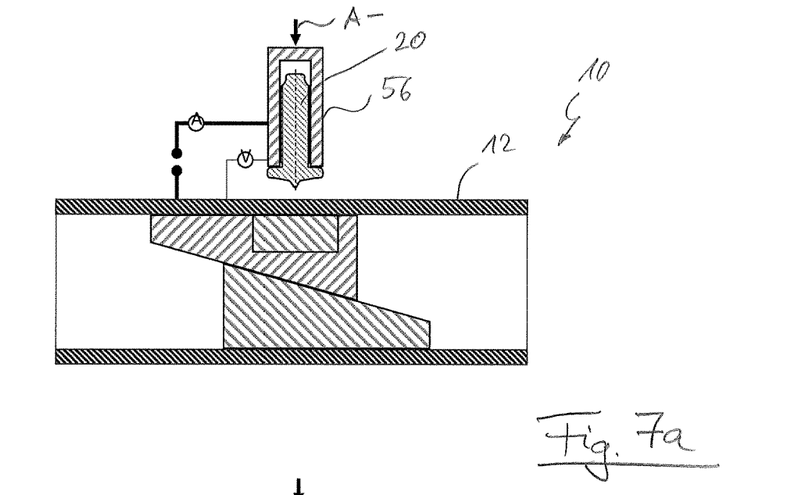
FIGS. 7a to 7c a sixth embodiment of the apparatus in accordance with the invention in different states.
Figure 7B:
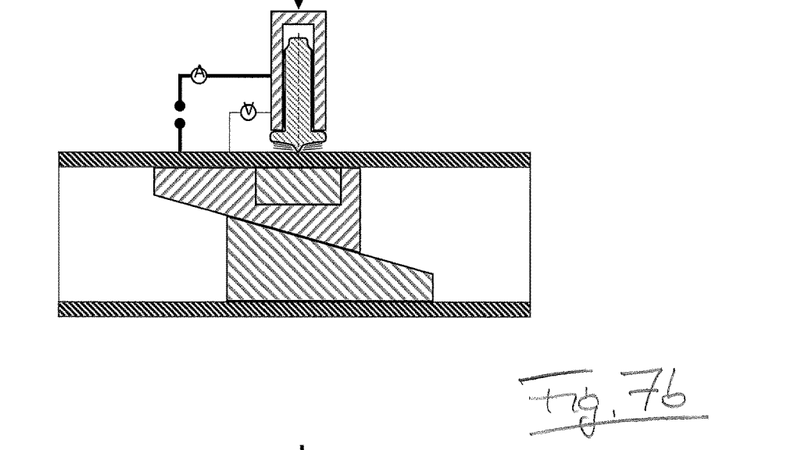
Figure 7C:
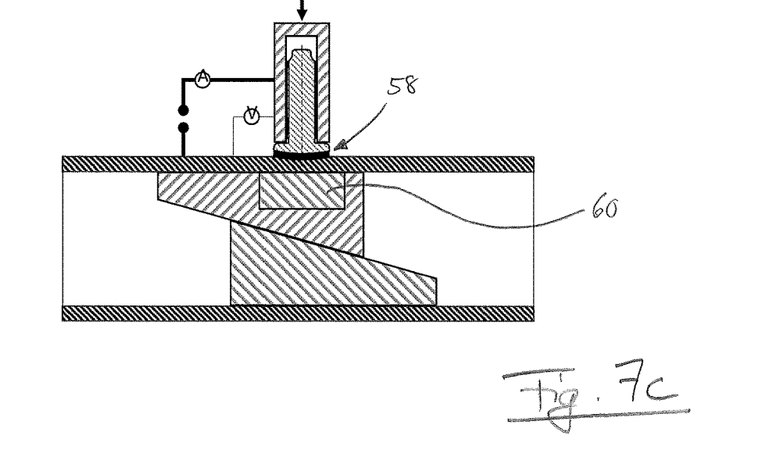

FIGS. 7a to 7c illustrate that the support device 16 of FIGS. 5a to 6b can also be used in a fastening process that does not include a cold forming process. A welding process is shown in which a bolt element 20 is pressed against the side section 12 of the hollow section 10 by a setting device 56 that was not shown in FIGS. 5a to 6b for the sake of simplicity. By applying an electrical voltage, a welding process then takes place (cf. FIG. 7b) by which a weld connection 58 is produced that securely fixes the fastening element 20 to the hollow section 10.

Since no mechanical cold forming of the element 20 or of the side section 12 takes place in this embodiment, the reshaping element 50 has been displaced by a supporting element 60 having a planar surface in the procedure in accordance with FIGS. 7a to 7c.

Figure 8A:
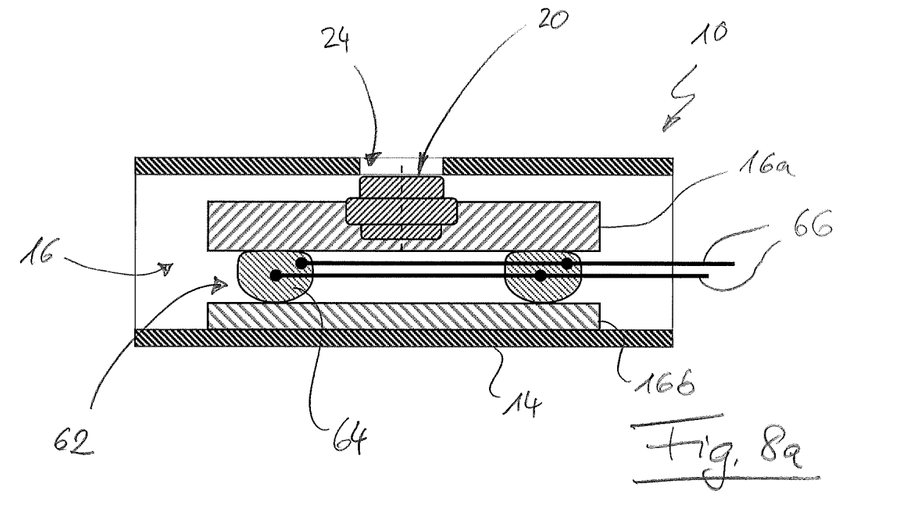
FIGS. 8a and 8b a seventh embodiment of the apparatus in accordance with the invention in different states.
Figure 8B:
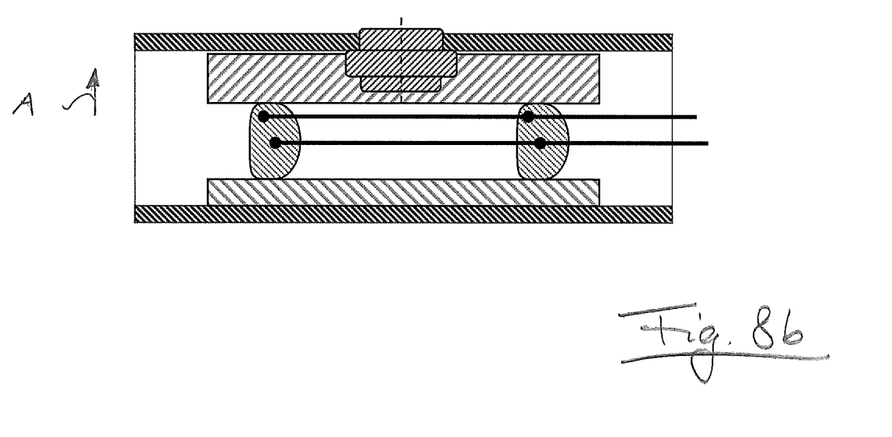

With reference to FIGS. 8a and 8b, it should be made clear that the support device 16 does not necessarily have to comprise a mechanism having a cooperating wedge section. In the embodiment shown, the support device has, in addition to the support elements 16a and 16b, an eccentric device 62 that acts between them and that, for example, comprises two eccentric elements 64 (the number of eccentric elements 64 is arbitrary). Due to a rotation of the eccentric elements 64 (for example, by linkage components 66, such as are shown in FIGS. 8a and 8b, acting on the eccentric elements or by a directly effective rotary drive), the support element 16a is moved upwardly in the axial direction A via the side section 14b and a stationary supporting surface, not shown, at the support element 16b until the working position shown in FIG. 8b is reached.

It is understood that aspects of the support device 16 described with reference to FIGS. 2a to 7c can also be applied to the support device 16 in accordance with FIGS. 8a to 8b.

Instead of a wedge mechanism or an eccentric mechanism for spreading the support device 16 in the axial direction A, directly acting actuators can also be provided, for example pneumatic actuators, hydraulic actuators, and/or electromechanical actuators. The generation of the drive-effective forces required for a wedge mechanism and/or an eccentric mechanism can likewise be provided by actuators of said kind.

The concept in accordance with the invention makes it possible to fasten conventional functional elements to a hollow section, which was previously not possible or only possible with a very great effort.

REFERENCE NUMERALS 10a, 10b, 10c, 10d, 10 hollow section
12 14 side section
12a, 14b surface
13 hollow space
16 support device
16a, 16b support element
17 spreading device 17a, 17b wedge section
18a, 18b support surface
20 fastening element
22 rivet section
24 hole
26, 26' punch
28 reshaped section
30 reshaping section
32a, 32b intermediate element
34 recess
36 flange
38a surface
40 wedge element
42 matrix element
44 removal passage
46 slug
48 passage
50 reshaping element
52 reshaping section
54 fastening section
56 setting device
58 weld connection
60 supporting element
62 eccentric device
64 eccentric element
66 linkage
T translatory movement
A, A– axial direction, axial movement

The invention claimed is:

1. An apparatus for fastening a functional element to a section of a workpiece and/or for reshaping a section of the workpiece, said apparatus comprising a support device for supporting the workpiece, wherein the workpiece section has a first surface facing the support device and a second surface facing away from the support device,
   wherein the support device comprises a first support element having a first workpiece support surface that is associated with the first surface, and a second support element having a second workpiece support surface that faces away from the first workpiece support surface and that is associated with a supporting surface;
   wherein the first and the second support element are movable relative to one another by means of a spreading device such that the first and the second workpiece support surface can be moved away from one another in an axial direction, and
       wherein the support device comprises a first intermediate element that is arranged between the first workpiece support surface and the first surface, and/or wherein the support device comprises a second intermediate element that is arranged between the second workpiece support surface and the supporting surface.

2. The apparatus in accordance with claim 1, wherein the axial direction extends perpendicular to the first and/or second workpiece support surface.

3. The apparatus in accordance with claim 1, wherein the apparatus comprises a punch movable along the axial direction for reshaping a section of the functional element and/or the workpiece section.

4. The apparatus in accordance with claim 3, wherein the punch and/or the setting device comprises/comprise a first reshaping section for reshaping a fastening section of the functional element and/or the workpiece section.

5. The apparatus in accordance with claim 4, wherein the first and/or the second reshaping section has/have a punching edge.

6. The apparatus in accordance with claim 1, wherein the apparatus comprises a setting device movable along the axial direction for guiding the functional element to the second surface.

7. The apparatus in accordance with claim 1, wherein the first workpiece support surface and/or the first intermediate element has/have a recess for at least partly receiving the functional element during the fastening process.

8. The apparatus in accordance with claim 1, wherein the first support element comprises a second reshaping section for reshaping a section of the functional element and/or the workpiece section.

9. The apparatus in accordance with claim 8, wherein the second reshaping section is formed at a reshaping element that is releasably fastened to the first support element.

10. The apparatus in accordance with claim 1, wherein the spreading device has at least a first and a second wedge section that cooperate with one another such that a translatory movement can be converted into the movement in the axial direction.

11. The apparatus in accordance with claim 1, wherein the spreading device comprises at least one eccentric device having at least one eccentric element by whose rotation the movement in the axial direction can be produced.

12. The apparatus in accordance with claim 1, wherein the spreading device comprises a hydraulic actuator and/or a pneumatic actuator and/or an electromechanical actuator.

13. The apparatus in accordance with claim 1, wherein the support device is designed such that it can be introduced into a hollow space of a workpiece that is configured as a hollow section and that comprises the workpiece section provided for fastening the functional element and/or the workpiece section provided for reshaping and a supporting section which is disposed opposite said workpiece section and at which the supporting surface is formed.

14. The apparatus in accordance with claim 1, wherein the workpiece is an extruded section.

15. The apparatus in accordance with claim 1, wherein the functional element is produced from metal.

16. A method of fastening a functional element to a section of a workpiece and/or of reshaping a section of the workpiece using an apparatus comprising a support device for supporting the workpiece, wherein the workpiece section has a first surface facing the support device and a second surface facing away from the support device,
   wherein the support device comprises a first support element having a first workpiece support surface that is associated with the first surface, and a second support element having a second workpiece support surface that faces away from the first workpiece support surface and that is associated with a supporting surface;
   wherein the first and the second support element are movable relative to one another by means of a spreading device such that the first and the second workpiece support surface can be moved away from one another in an axial-direction, and
       wherein the support device comprises a first intermediate element that is arranged between the first workpiece support surface and the first surface, and/or wherein the support device comprises a second intermediate element that is arranged between the second workpiece support surface and the supporting surface,
   comprising the steps:
       positioning the workpiece and/or the support device such that the workpiece section is arranged adjacent to the first intermediate element and the workpiece support surface of the first support element;

actuating the spreading device until the first workpiece support surface is—directly or indirectly—in contact with the first surface and the second workpiece support surface is—directly or indirectly—in contact with the supporting surface; and moving a punch in the axial direction toward the second surface to fasten the functional element to the workpiece section and/or to reshape the workpiece section or moving the functional element by means of a setting device in the axial direction toward the second surface to fasten the functional element to the workpiece section.

17. The method in accordance with claim 16, wherein the workpiece is a hollow section having a hollow space that is sectionally bounded by the first surface and a third surface that is disposed opposite the first surface and that comprises the supporting surface.

18. The method in accordance with claim 16, wherein an opening is produced in the workpiece section prior to the step of positioning the workpiece and/or the support device, said opening being provided for receiving a section of the functional element.

19. The method in accordance with claim 16, wherein the support device is fitted with at least one functional element prior to the step of positioning the workpiece and/or the support device.

20. The method in accordance with claim 19, wherein an opening is produced in the workpiece section prior to the step of positioning the workpiece and/or the support device, said opening being provided for receiving a section of the functional element, and wherein the workpiece and/or the support device is/are positioned such that a section of the functional element is aligned with the opening and such that this section is introduced into the opening by the actuation of the spreading device.

21. The method in accordance with claim 16, wherein a reshaping of a section of the functional element is brought about by the movement of the punch.

22. The method in accordance with claim 16, wherein the reshaping of the workpiece section comprises a punching by which an opening is produced in the workpiece section.

23. The method in accordance with claim 16, wherein the functional element is introduced into the workpiece section in a self-punching manner.

24. A component assembly, manufactured in accordance with the method of claim 16, for fastening a functional element to a section of a workpiece and/or of reshaping a section of the workpiece, the component assembly comprising a hollow section, and at least one functional element that is fastened to a section of the hollow section by means of a clinching process, a riveting process, a pressing-in process, or a welding process.

25. The component assembly in accordance with claim 24, wherein the functional element is a nut element or a bolt element.

26. The component assembly in accordance with claim 24, wherein the functional element is self-punching.

* * * * *